United States Patent [19]

Ishiguro et al.

[11] Patent Number: 4,669,845
[45] Date of Patent: Jun. 2, 1987

[54] CAMERA

[75] Inventors: Minoru Ishiguro; Takashi Kamoda; Tetuo Nishizawa, all of Saitama; Shigeo Nakayama, Tokyo; Toshio Yoshida, Ibaragi, all of Japan

[73] Assignee: Fuji Photo Film Co., Ltd., Japan

[21] Appl. No.: 771,279

[22] Filed: Aug. 30, 1985

[30] Foreign Application Priority Data

Sep. 3, 1984 [JP] Japan ............................ 59-133754[U]
Dec. 26, 1984 [JP] Japan ............................ 59-200433[U]

[51] Int. Cl.$^4$ ............................................ G03B 17/02
[52] U.S. Cl. ................................................. 354/288
[58] Field of Search ........................ 354/288, 212-216

[56] References Cited

U.S. PATENT DOCUMENTS 4,324,476 4/1982 Seely .................................... 354/288
4,339,193 7/1982 Harvey ................................ 354/288

FOREIGN PATENT DOCUMENTS 2130387 5/1984 United Kingdom .

Primary Examiner—L. T. Hix
Assistant Examiner—Brian W. Brown
Attorney, Agent, or Firm—Pasquale A. Razzano

[57] ABSTRACT

In a camera of the drop-in loading type having a film insertion opening formed at the bottom of the camera body, a device is provided for restricting a back lid, supported for pivotal opening and closing movement on the camera, to a partially opened position where the insertion opening is exposed and a guide slot is defined between the camera body and the back lid for allowing a film container with a film leader previously drawn out to be inserted therethrough. The restricting device can be released for full opening in order that the back lid is full opened to a position where the rear of the camera body is exposed to allow repairing an interior mechanism.

15 Claims, 9 Drawing Figures

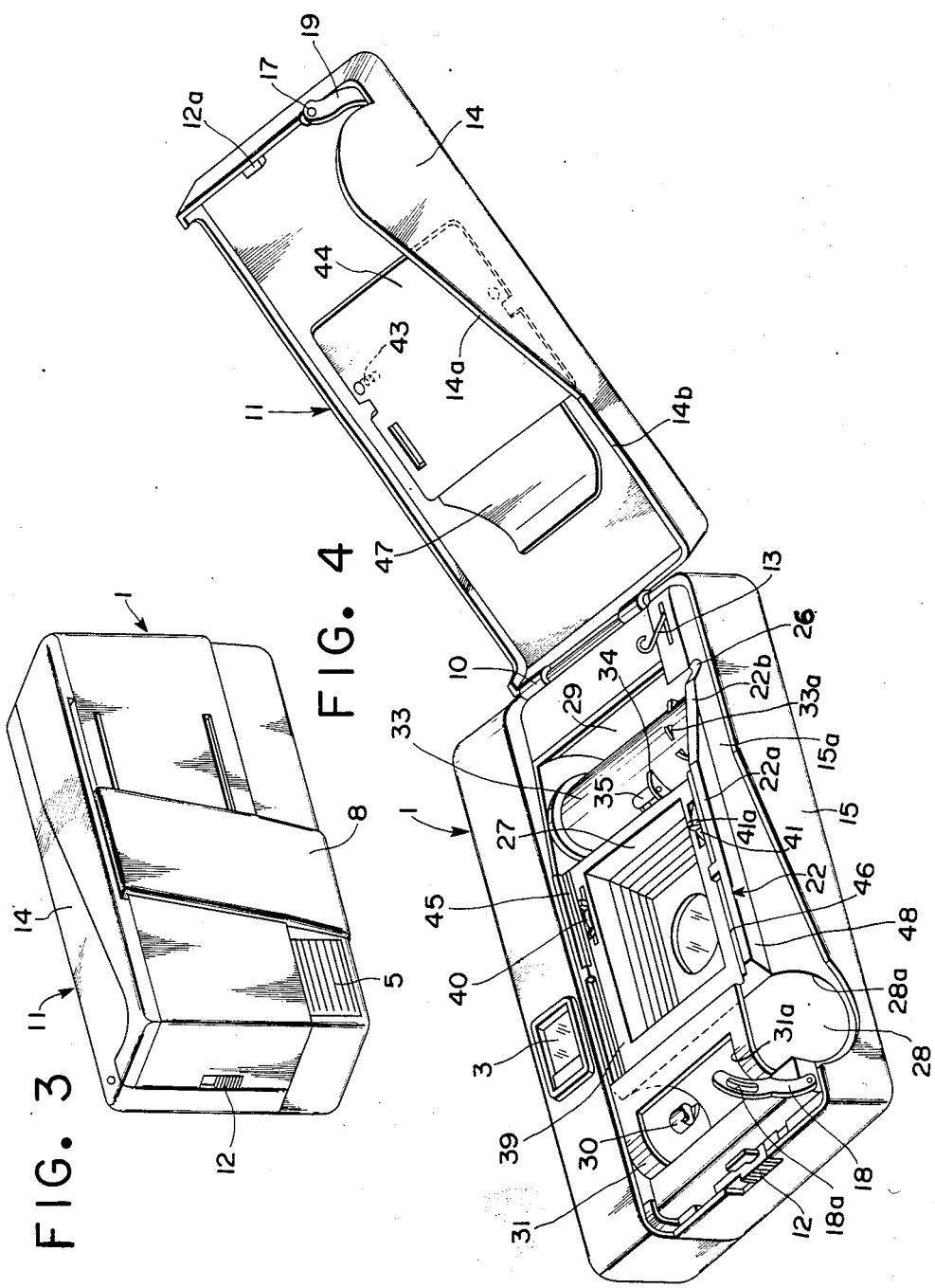

CAMERA

BACKGROUND OF THE INVENTION

1. Field of the Invention

The present invention relates to a drop-in loading type camera in which a film container is inserted endwise into a film supply chamber.

2. Description of the Prior Art

Several kinds of drop-in loading cameras have previously been proposed which include a film supply chamber having an insertion opening formed at the bottom of the camera through which a film container is inserted for loading. One of these previously proposed drop-in loading cameras has a film leader guide slot, extending between the film supply chamber and a film take-up chamber, through which a film leader, previously drawn out of the film container, is inserted longitudinal edge first when the film container is dropped into the film supply chamber. This type of camera is disclosed in, for example, International Publication No. WO 82/03926.

One of the problems associated with the above-mentioned cameras is that, because of the fact that the camera has a film leader guide slot formed as a structural part of the camera body, a complicated mechanism and a thick camera body is required. Furthermore, it is difficult to form a wide film leader guide slot. This difficulty can result in a failure to insert the film leader with ease, as well as bending of the lateral margin of the film leader when the film leader is forced into the film leader guide slot.

OBJECTS OF THE INVENTION

It is an object of the present invention to provide a camera in which a film leader is inserted into the camera with ease.

Another object of the present invention is to provide a camera which has a thin camera body and a simplified camera mechanism.

A further object of the present invention is to provide a camera having a back lid which can be partially opened to permit film loading and also fully opened for access to the camera interior.

SUMMARY OF THE INVENTION

The above and other objects of the present invention are achieved by providing means for restricting a back lid, pivotally mounted on a camera, to a partially opened position to expose an insertion opening formed at the bottom of the camera body and a guide slot defined between longitudinal bottom edges of the back lid and the camera body. A film leader, previously drawn out of the film container, can then be inserted into a film passageway provided between film supply and film take-up chambers when the film container is dropped into the film supply chamber through the insertion opening. The back lid also can be fully opened, by releasing the restricting means, to a position where the rear side of the camera body is exposed to permit repair of an interior mechanism.

In accordance with the present invention, since there is no requirement for forming the guide slot in the camera body, the camera can be made simple in construction, at a low cost, without being bulky. The film guide slot, which is defined between the bottom edges of the back lid and the camera body by partially opening the back lid, is wide enough to permit smooth insertion of a film leader into the guide slot without any bending of the film leader. Furthermore, in accordance with the present invention, the restriction means is adapted to be elastically deformable so as to be disengaged from a member provided in the camera body and thus permit the back lid to be fully opened.

BRIEF DESCRIPTION OF THE DRAWINGS

The above-mentioned and other objects, features and advantages of the present invention will become apparent from the following detailed description of the preferred embodiments of the present invention as illustrated in the accompanying drawings, in which:

FIG. 3 is a perspective view illustrating the camera of FIG. 1, but with the back lid and front lens cover closed;

FIG. 4 is a perspective view illustrating the camera of FIG. 1 with the back lid fully opened;

Before the description of the present invention proceeds, it is noted that like parts are designated by like numerals and symbols throughout the several views of the accompanying drawings.

DETAILED DESCRIPTION OF THE INVENTION

Figure 1:
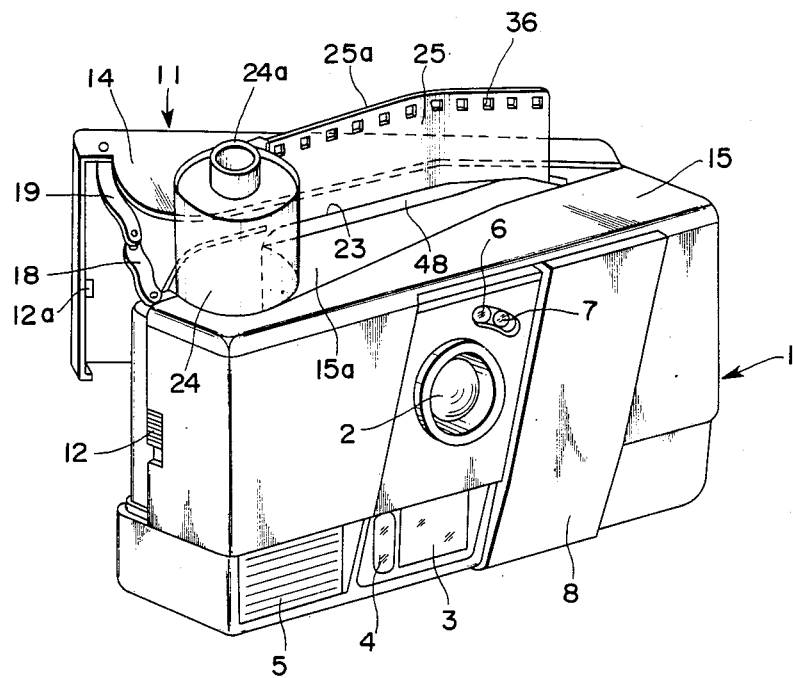
FIG. 1 is a perspective view illustrating a camera constructed in accordance with the present invention, bottom side up, with its back lid opened to a first, partially open position for film loading.

Referring now to the drawings in detail and initially to FIG. 1, a camera constructed in accordance with the present invention is illustrated with its bottom side up and back lid partially opened for permitting film loading. The camera includes a camera body 1 having a taking lens 2 located substantially in the middle of the body, a view finder window 3, a window 4 through which an autofocus beam is projected onto an object to be photographed, and an artificial illumination or flash device 5. The view finder 3, autofocus beam window 4, and flash 5 are disposed at the upper edge of the camera (which appears at the bottom of FIG. 1) above the taking lens 2. Autofocus beam receiving windows 6 and 7 for short and long distances, respectively, are disposed side by side at the lower edge of the camera adjacent taking lens 2. The camera also includes a lens cover 8 which is slidably mounted on the camera body 1 to selectively cover and uncover the windows 3,4,5, and 6, as well as the taking lens 2.

Figure 2:
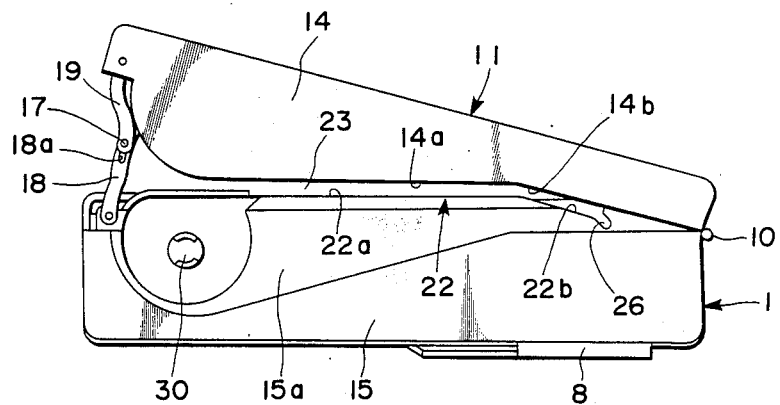
FIG. 2 is a bottom plan view of the camera of FIG. 1.

As shown in FIG. 2, a back lid 11 is pivotally mounted for opening and closing movement on a hinge 10 disposed at one side of camera body 1. A manually slidable locking member 12 is located on the other side of camera body 1 from hinge 10 and is urged by a spring (not shown) to engage a finger or tab 12a mounted on back lid 11. The slidable movement of locking member 12 to its upper position permits back lid 11 to be forced open by a spring 13 (shown in FIG. 4) when locking member 12 is actuated.

Back lid 11 has a bottom wall 14 which includes an edge having a first straight edge section 14a and an angularly related second edge section 14b. Bottom wall 14 overlaps and matches with a recessed section 15a formed in bottom 15 of camera body 1. In order to restrict back lid 11 to its first or partially opened position, a restriction means is provided which comprises a pair of levers 18, 19 respectively pivotally mounted on camera body 1 and back lid 11. These levers are loosely coupled to each other at their respective free ends so as to be foldable and unfoldable or outstreached (i.e. released from each other). The loose coupling is achieved by a slot 18a formed in lever 18 which receives a pin 17 mounted on lever 19. This restriction means limits the angle through which back lid 11 is opened by spring 13 when pin 17 is engaged in slot 18a. However, the back lid can be fully opened by disengaging the pin-slot coupling, so as to expose the rear side of camera body 1, as shown in FIG. 4, to permit access to the interior of the camera for repairing an interior mechanism.

Referring again to FIG. 2, when back lid 11 is partially opened for film loading, a guide slot 23 is defined between the bottom wall's edge sections 14a, 14b, and the bottom edge 22 of the camera body. This slot permits insertion of a film leader 25, previously drawn out of film container 24, (shown in FIG. 1) into a film passageway (not shown) in the camera body.

Bottom edge 22 of camera body 1 has a first straight edge section 22a and a second edge sections 22b at an angle to end section 22a. Edge sections 22a, 22b correspond respectively to edge sections 14a, 14b of bottom wall 14, thereby to provide a uniform width for guide slot 23. A groove or notch 26 is formed at one end of bottom edge 22, in the recessed section 15a of the camera body (FIG. 4) adjacent the edge 22b thereby effectively elongating guide slot 23. This elongation of guide slot 23 by notch 26 aids in the insertion of an excessively drawn-out film leader.

Referring again to FIG. 4, wherein back lid 11 is shown in its fully opened position, it is seen that camera body 1 has an exposure aperture 27 at its center for permitting scene light to pass therethrough and reach a film placed in exposure position therebehind when the camera's shutter is opened for exposure. A film supply chamber 28 is provided at the left of exposure aperture 27 and a film take-up chamber 29 is provided to its right. Film supply chamber 28 is opened at its bottom through an insertion opening 28a formed in the bottom of the camera body. On the other hand, at the top of film supply chamber 28, a film rewinding shaft, having a fork 30, is rotatably mounted for operatively engaging a conventional cross rib provided at one end of the spool shaft 24a of a film container 24 (see FIG. 1). Film rewinding shaft 24 is driven for rotation in any convenient manner to continuously rewind exposed film into film container 24.

Film supply chamber 28 also includes a positioning plate 31 which forces the film container 24 to be held in proper position. Positioning plate 31 has an opening 31a formed therein to permit the film container 24 to be removed from supply chamber 28 with the operator's fingers.

A take-up spool 33 is provided within film take-up chamber 29 and includes an annular series of claws 33a on its outer periphery and a guide member 34 having a roller 35 rotatably mounted at its free end. Roller 35 operates to press the film leader 25 with its perforations 36 engaged by the claws 33a, onto the peripheral surface of take-up spool 33.

Film guide surfaces 39, are provided on the upper and lower sides of exposure aperture 27. A sprocket 40, having an annular series of teeth or projections engageable with perforations in the film is provided in one of these guide surfaces and is driven by the film for metering purposes. The other film guide surface has a rotary disk 41 extending therethrough which includes a tooth 41a, also engageable with the film perforations, for advancing the film leader 25 toward film take-up spool 33.

A pressure plate 44 is mounted on the inside of back lid 11 and is pressed against stepped portions 45,46 of the camera body 1 by a coil spring 43 when the back lid 11 is closed. This results in providing a film passageway between the film guide surfaces 39 and the pressure plate 44. A film guide plate 47 is fixed on one side of pressure plate 44 to guide film leader 25 toward the peripheral surface of film take-up spool 33 so as to bring it in contact therewith when the back lid is closed.

To load film in the camera of the embodiment shown in FIGS. 1 to 4, the camera is held with its bottom side up and back lid 11 is opened by sliding locking member 12 downwardly. This releases locking member 12 from the finger 12a on the back lid, which is then automatically opened by the force of spring 13 until further movement is restricted by the restriction means 18, 19 so as to expose the insertion opening 28a and to define the guide slot 23 between the bottom edge sections 14a, 14b, and 22a, 22b.

After the back lid is opened in this manner, the film container, as shown in FIG. 1, is dropped axially into film supply chamber 28 through insertion opening 28a. At the same time, film leader 25, which was previously drawn out of the film container 24 and is normally curled, is introduced into slot 23, with the part of film leader 25 adjacent the film container 24 entering guide slot 23 first and being guided by a slanted portion 48 of the recessed section 15a of the bottom 15. As a result the curled film leader 24 is straightened as it is inserted into the film passageway. This straightening, which results from the elasticity of film leader 25, is effected in such a way that the film leader 25 bends backward (toward back lid 11) on its upper longitudinal edge side 25a. Since guide slot 23, which is defined between the bottom edges of the back lid 11 and camera body 1, is wide, film leader 25 is straightened smoothly.

As back lid 11 is closed after the film loading operation, insertion opening 28 is covered by bottom wall 14 and pressure plate 44 is pressed against the stepped portions 45, 46 to keep the film flat. When the back lid 11 is fully closed, against the bias of spring 13, the motor contained within the take-up spool 33 is actuated for rotation, in any convenient manner, in order to rotate take-up spool 33 and rotary disk 41. As a result, the tooth 41a of rotary disk 41 is brought into engagement with a film perforation 36 so as to advance the film leader 25 to the film take-up chamber 29. The film leader 25, thus advanced, is brought into contact with take-up spool 33 by means of film guide plate 47 and roller 35, while perforations 36 are engaged by claws 33a. As a result, film leader 25 is wound around the film take-up spool 33. Continuous winding of the film through several unavailable leading frames forces the motor to stop, which is well known in the art.

When a photograph is to be taken, front lens cover 8 is moved to the position shown in FIG. 1 to expose lens 2, view finder 3 and the other elements. Thereafter, with every manipulation of the shutter actuating member (not shown), the film is automatically wound by one frame. The automatic film winding sets the shutter mechanism in preparation for a following exposure. In this prefered embodiment, complete exposure of all available frames of the film causes the motor to start its rotation in the reverse direction to rewind the film automatically into film container 24 in a well-known manner.

To remove film container 24 from camera 1, back lid 11 is opened to the position shown in FIG. 1 by slidable moving locking member 12 to allow finger access to film container 24. The film container 24 is easily ejected from the film supply chamber 28 by being pushed by the operator's fingers through opening 31a of plate 31.

In the above-described embodiment of the present invention, although back lid 11 is shown as being pivotally mounted on camera body 1 at the side where the film take-up chamber 29 is located, it is contemplated that back lid 11 may be pivotally mounted at the top of the camera body, so as to open backwardly.

Figure 5:
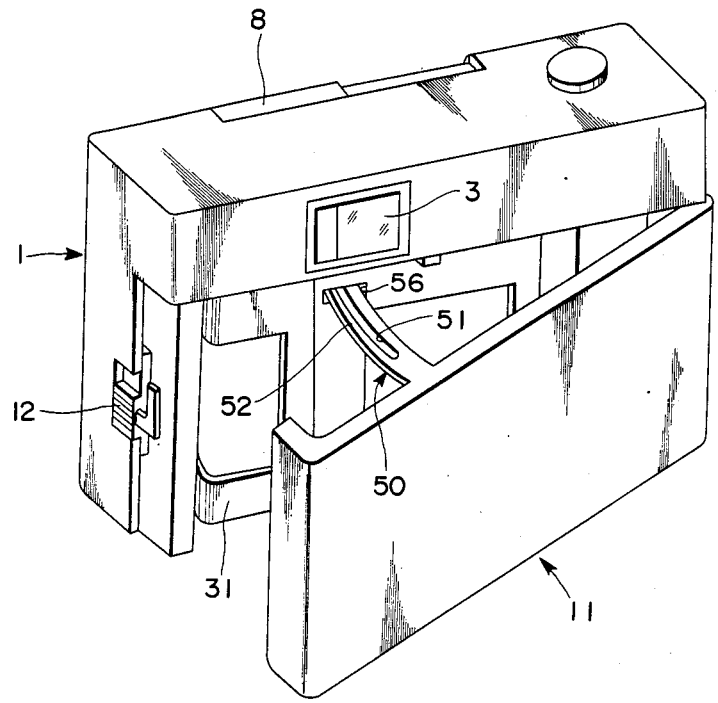
FIG. 5 is a perspective view illustrating another embodiment of the camera of the present invention.
Figure 6:
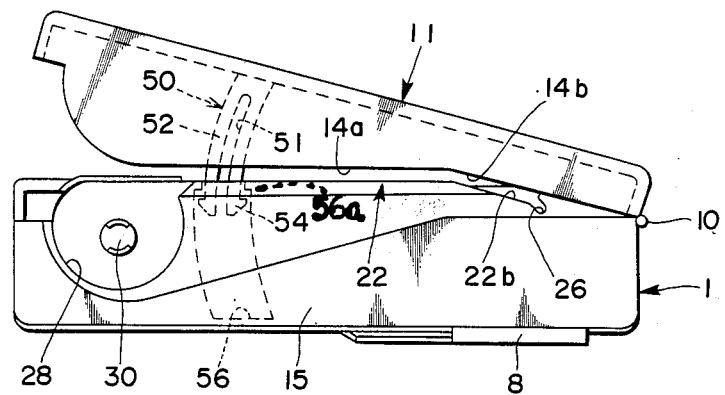
FIG. 6 is a bottom plan view of the camera of FIG. 5.
Figure 7:
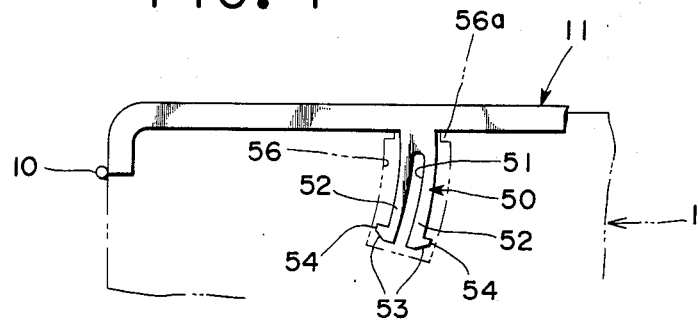
FIG. 7 is a schematic illustration showing the general actions of the restriction means of the camera of FIG. 5.

FIGS. 5 to 7 illustrate another embodiment of the present invention in which only the restriction means differs from that of the previously described embodiment.

In this embodiment the restriction means comprises an arcuate lever 50 made of an elastic material, such as plastic, and formed integrally with back lid 11. The arcuate lever 50, which extends forwardly from back lid 11, has a circular arcuate slot 51 formed therein whose center of rotation is located at hinge 10. The slot defines two legs 52, each of which has a lateral projection 54 with a sloped edge 53.

An arcuate hole or slot 56 is formed in camera body 1 to slidably receive arcuate lever 50. Arcuate hole 56 has an end opening 56a with a width larger than that of the arcuate lever 50, but smaller than the distance between the outer edges of projections 54. As a result, opening of back lid 11 is restricted to the position shown in FIG. 6 by the engagement of projections 54 with the end opening 56a. Projections 54 can be disengaged from the end opening 56a by pressing legs 52 against each other to permit them to be withdrawn out of hole 56, in order to allow back lid 11 to be fully opened. After being fully opened, by pushing or pivoting back lid 11 toward the camera body, the legs 52 are pressed against each other through sliding contact of the slopes of projections 54 with end opening 56a, so that lever 50 reenters into arcuate hole 56.

Figure 8:
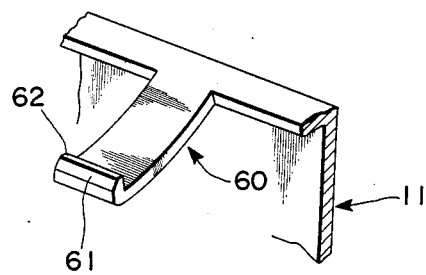
FIGS. 8 and 9 are schematic illustrations of other examples of restricting means suitable for use in the camera of the present invention.

FIG. 8 shows a still another embodiment of the opening restriction means. In this case the opening restriction means comprises a plate like arm 60 which has an upright tapered projection 62 at its end. Arm 60, which is made of plastic material, is formed integrally with back lid 11. The projection 62 is engageable with an opening, similar to opening 56a, (not shown in FIG. 8), formed in the rear of the camera body 1 to restrict full opening of back lid 11. The plate like arm is bendable downwardly to disengage it from the camera body and thus allow back lid 11 to be fully opened.

Figure 9:
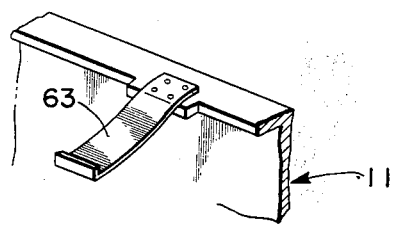

FIG. 9 shows a further embodiment of the opening restriction means. In this case the opening restriction means comprises an arm 63 made of a street metal. Arm 63 is fixed to back lid 11 by means of set screws. The action and function of arm 63 is quite similar to that of the arm 60 shown in FIG. 8.

Although the present inventon has been fully described by way of examples with reference to the accompanying drawing, it is to be understood that various changes and modifications can be effected therein by those skilled in the art without departing from the scope and spirit of the present invention.

What is claimed is:

1. A camera into which a film container including a coiled strip film with its leader previously drawn out may be axially inserted, said camera comprising:

a camera body having a film supply chamber, a film take-up chamber in which film is taken up; and a back lid pivotally mounted on said camera body for pivotal opening and closing movement;

a said camera body including a first wall having an opening formed therein for allowing axial insertion of a film container into said film supply chamber; said back lid having a wall portion positioned to cover at least a portion of said first wall and said opening when said back lid is closed and to expose said opening when said back lid is opened; said first wall having a free peripheral edge portion facing said back lid wall portion and leading directly from said opening;

said back lid wall portion having a longitudinal edge cooperating with said free edge of the first wall when said back lid is opened to define a narrow guide slot between said edges into which said leader is inserted upon insertion of said film container into said supply chamber.

2. A camera as defined in claim 1, wherein said wall portion of the back lid extends inwardly from the back lid towards the camera body to cover said opening and first wall when said back lid is closed.

3. A camera as defind in claim 2, wherein said back lid is pivotally mounted on said camera body on the side thereof adjacent said film take-up chamber.

4. A camera as defined in claim 3 wherein said the longitudinal edge of the wall portion of the back lid has a slanted edge portion extending at an angle to the back lid whereby the slot defined between said slanted edge portion and the edge portion of the camera body is parallel to the camera body when said back lid is partially opened.

5. A camera as defined in claim 4 wherein said opening is in the bottom of the camera and said inwardly extending wall is on the bottom side of the back lid.

6. A camera as defined in claim 5, wherein said camera body has a bottom edge including an edge section slanting toward the front of said camera body at the side thereof adjacent said film take-up chamber, said bottom edge defining a substantially V-shaped parallel slot in association with said slanted edge portion of said wall.

7. A camera as defined in claim 4, including means for restricting movement of said back lid to a position wherein said back lid is partially opened to define said parallel slot.

8. A camera as defined in claim 7, wherein said restricting means comprises two levers disconnectably and pivotally coupled to each other at one end thereof and supported at their other ends for pivotal movement on said camera body and back lid, respectively.

9. A camera as defined in claim 7, wherein said restricting means comprises a latch member in said camera body and a restriction member extending from said back lid having an engaging end which is ordinarily engaged with said latch member for restricting said back lid to said partially opened position and is disengagable from said latch member by elastic deformation, for allowing said back lid to be fully opened.

10. A camera as defined in claim 9, wherein said restriction member has a slot formed at least at its distal end relative to the back lid, thereby to define two legs, and said engaging end has projections on both lateral sides.

11. A camera as defined in claim 9, wherein said restriction member comprises an elastic, plate-like member and has an upright projection at its free end.

12. A camera as defined in claim 9, wherein said engaging end has a tapered surface which comes in contact with said latch member when said engaging end is engaged with said latch member.

13. A camera as defined in claim 10, wherein said restriction member is formed integrally with said back lid.

14. A camera as defined in claim 13, wherein said restriction member is made of a plastic material.

15. A camera as defined in claim 11, wherein said plate-like member is made of a sheet metal.

* * * * *